US008861739B2

(12) United States Patent
Ojanpera

(10) Patent No.: US 8,861,739 B2
(45) Date of Patent: Oct. 14, 2014

(54) APPARATUS AND METHOD FOR GENERATING A MULTICHANNEL SIGNAL

(75) Inventor: Juha P. Ojanpera, Nokia (FI)

(73) Assignee: Nokia Corporation, Espoo (FI)

(*) Notice: Subject to any disclaimer, the term of this patent is extended or adjusted under 35 U.S.C. 154(b) by 1303 days.

(21) Appl. No.: 12/291,457

(22) Filed: Nov. 10, 2008

(65) Prior Publication Data

US 2010/0119072 A1 May 13, 2010

(51) Int. Cl.
*H04R 5/00* (2006.01)
*G06F 17/00* (2006.01)
*G10L 19/008* (2013.01)

(52) U.S. Cl.
CPC .................................... *G10L 19/008* (2013.01)
USPC ................. 381/23; 381/17; 381/18; 704/500; 704/E19.005

(58) Field of Classification Search
USPC ................. 381/17, 18, 23; 704/E19.005, 500
See application file for complete search history.

(56) References Cited

U.S. PATENT DOCUMENTS

| | | | | |
|---|---|---|---|---|
| 5,852,800 | A * | 12/1998 | Modeste et al. | 704/270.1 |
| 7,277,692 | B1 * | 10/2007 | Jones et al. | 455/412.1 |
| 2004/0096066 | A1 | 5/2004 | Metcalf | 381/26 |
| 2004/0156512 | A1 | 8/2004 | Parker | 381/74 |

FOREIGN PATENT DOCUMENTS

| | | | |
|---|---|---|---|
| EP | 0544232 | A2 | 6/1993 |
| WO | WO-2007060443 | A2 | 5/2007 |
| WO | WO-2008046531 | | 4/2008 |
| WO | WO-2008069597 | | 6/2008 |

OTHER PUBLICATIONS

Gerzon, Michael A., "General Metatheory of Auditory Localisation", AES 92$^{nd}$ Convention, Mar. 1992, Preprint 3306, 63 pgs.
Pulkki, Ville, "Audio Virtual Sound Source Positioning Using Vector Base Amplitude Panning", JAES vol. 45 Issue 6, Jun. 1997, pp. 456-466.
T. Sporer, B. Klehs, et al., "Perceptual evaluation of 5.1 downmix algorithms", AES 119$^{th}$ Convention, New York, New York, Oct. 7-10, 2005, Convention Paper 6543, 10 pgs.
J. Herre, C. Faller, et al., "MP3 Surround: efficient and compatible coding of multi-channel audio", AES 116$^{th}$ Convention, May 8-11, 2004, Preprint 6049, 14 pgs.
J. Szczerba, F. de Bont, et al., "Matrixed multi-channel extension for AAC codec", AES114th Convention, Mar. 22-25, 2003, Preprint 5796, 9 pgs.
C. Faller, "Coding of spatial audio compatible with different playback formats", AES117th Convention, Oct. 28-31, 2004, Preprint 6187, 12 pgs.

(Continued)

*Primary Examiner* — Lynne Gurley
*Assistant Examiner* — Vernon P Webb
(74) *Attorney, Agent, or Firm* — Harrington & Smith

(57) ABSTRACT

An apparatus comprises a processor configured to receive a first audio signal and first location data, the first location data relating to a location of a source of the first audio signal; receive a second audio signal and second location data, the second location data relating to a location of a source of the second audio signal; receive selected location data relating to a selected location; and generate a multichannel signal in dependence on the first and second audio signals, the first and second location data and the selected location data.

24 Claims, 7 Drawing Sheets

(56) References Cited

OTHER PUBLICATIONS

A. Seefeldt, M.S. Vinton, C. Q. Robinson, "New techniques in spatial audio coding", AES119th Convention, Oct. 7-10, 2005, Preprint 6587, 13 pgs.

Samsudin, et al., "A stereo to mono downmixing scheme for MPEG-4 parametric stereo encoder", ICASSP 2006, pp. 529-532.

C. Dubey, R. Annadana, et al., "New enhancements to immersive field rendition (ISR) system", AES122nd Convention, May 5-8, 2007, Preprint 7080, 8 pgs.

F. Baumgarte, C. Faller, P. Kroon, "Audio coder enhancement using scalable binaural coding with equalized mixing", AES116th Convention, May 8-11, 2004, Preprint 6060, 9 pgs.

ITU-R Recommendation BS, 775-2, "Multichannel stereophonic sound system with and without accompanying picture", International Telecommunication Union, Geneva, Switzerland, 1992-1994-2006, 11 pgs.

* cited by examiner

APPARATUS AND METHOD FOR GENERATING A MULTICHANNEL SIGNAL

FIELD

This relates to an apparatus for generating a multichannel signal. This also relates to a method of generating a multichannel signal.

BACKGROUND

It is known to record a stereo audio signal on a medium such as a hard drive by recording each channel of the stereo signal using a separate microphone. The stereo signal may be later used to generate a stereo sound using a configuration of loudspeakers, or a pair of headphones.

SUMMARY

This specification provides an apparatus comprising a processor configured to receive a first audio signal and first location data, the first location data relating to a location of a source of the first audio signal, receive a second audio signal and second location data, the second location data relating to a location of a source of the second audio signal, receive selected location data relating to a selected location and generate a multichannel signal in dependence on the first and second audio signals, the first and second location data and the selected location data.

This specification also provides a method comprising receiving a first audio signal and first location data, the first location data relating to a location of a source of the first audio signal, receiving a second audio signal and second location data, the second location data relating to a location of a source of the second audio signal, receiving selected location data relating to a selected location; and generating a multichannel signal in dependence on the first and second audio signals, the first and second location data and the selected location data.

BRIEF DESCRIPTION OF THE DRAWINGS

Embodiments will now be described, by way of example only, with reference to the accompanying drawings in which.

DETAILED DESCRIPTION OF THE EMBODIMENTS

Figure 1:
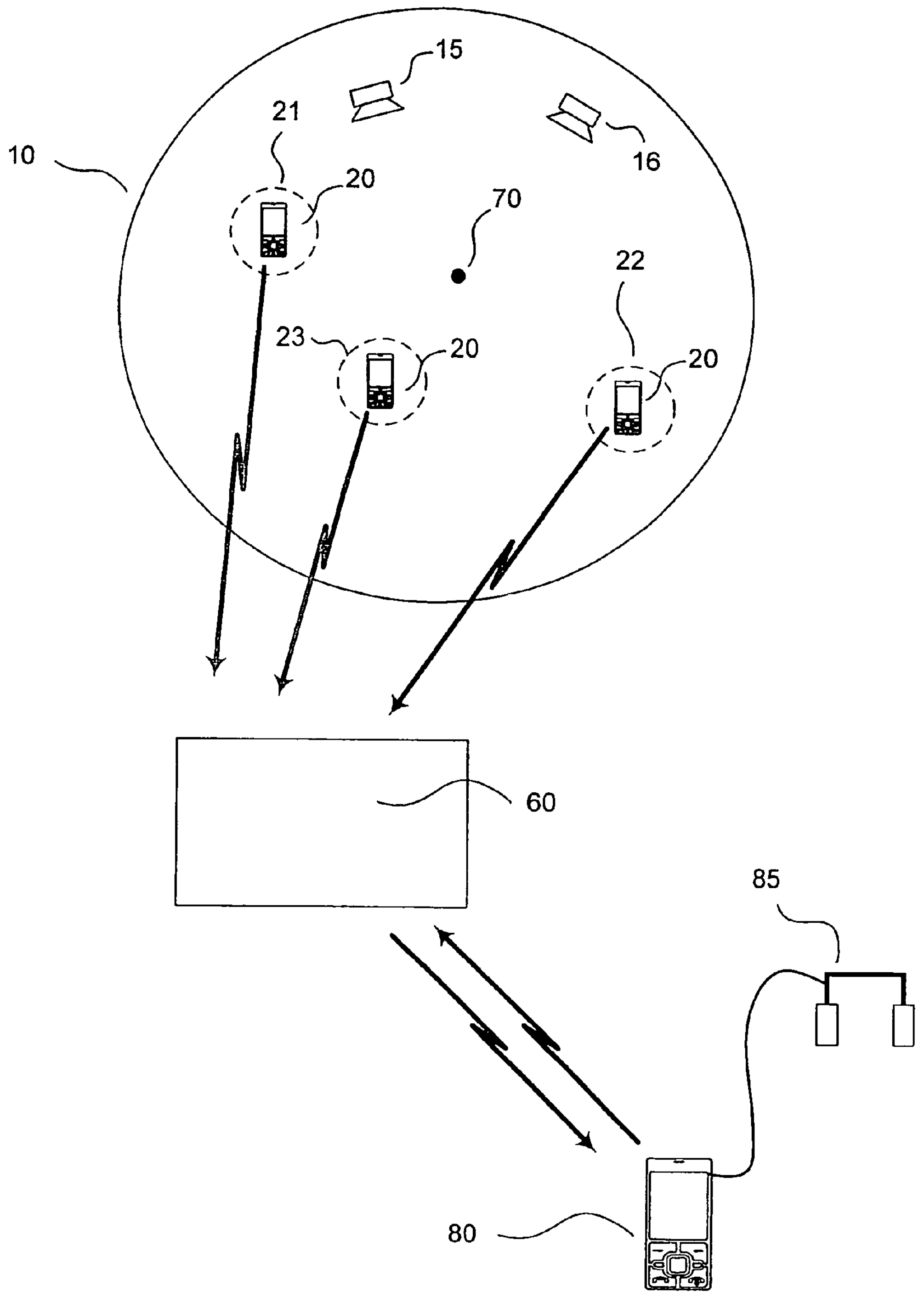
FIG. 1 is a schematic diagram illustrating a system by which a stereo signal may be obtained, and is used to illustrate embodiments.

FIG. 1 shows an area 10 in which is present plural sources 15, 16 of audio energy. Also present is a plurality of audio signal sources in the form of mobile communication terminals 20. Each mobile terminal 20 occupies a different location 21, 22, 23 within the area 10. The area 10 may, for example, comprise an event location such as a concert venue, a meeting room or a sports stadium.

Figure 2:
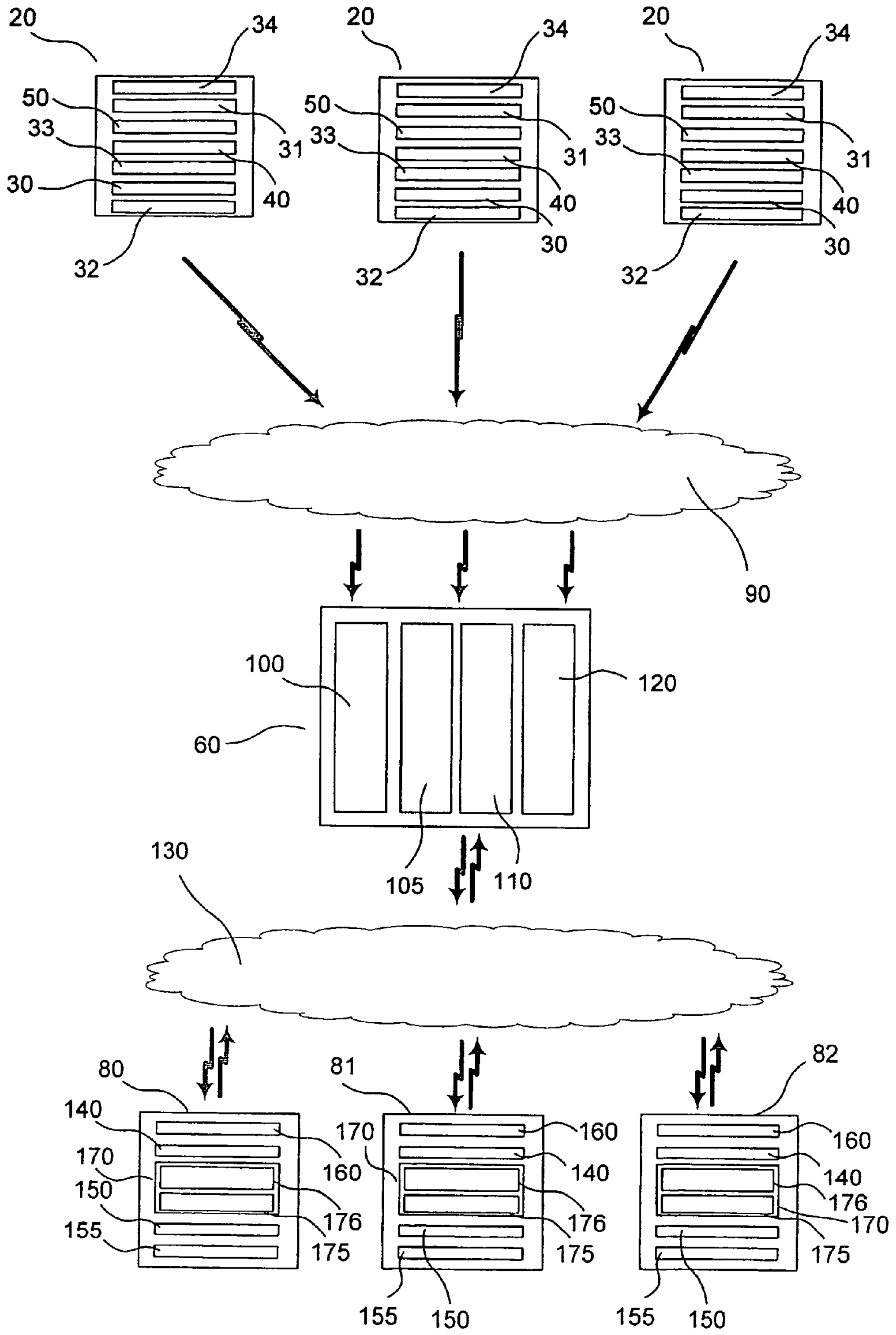
FIG. 2 is a schematic diagram illustrating a system for providing a stereo signal according to embodiments.

As shown in FIG. 2, each mobile terminal 20 has a microphone 30 to generate an electrical signal representative of detected sound. Each mobile terminal 20 further comprises a positioning module 40, such as a global positioning system (GPS) receiver. The positioning module 40 is operable to determine the location of the mobile terminal. Each mobile communication terminal 20 also includes an antenna 50 for communication with a remote cluster of cooperating servers 60, or alternatively with a single server 60. Each mobile terminal 20 is configured to encode signals generated by the microphone 20 to provide encoded audio signals. Each mobile terminal 20 is operable to transmit the encoded audio signals and location data identifying the location of the mobile terminal to server 60.

Referring to FIG. 1, a user may specify a location 70 in the area 10 at a user terminal, in the form of mobile user terminal 80, remote from the area 10. Mobile user-terminal 80 is configured to transmit selected location data corresponding to the user-specified location to server 60. Thus, the user determines the selected location.

Server 60 is configured to generate a multichannel signal, in the form of a stereo signal, in dependence on the received audio signals, audio signal source location data and selected location data and to transmit the generated stereo signal to the user terminal 80. The stereo signal may be an encoded stereo signal. The stereo signal may be encoded by the server 60 and decoded by the user terminal after the user terminal receives the encoded signal. The user may listen to the stereo sound corresponding to the stereo signal on a pair of headphones 85 connected to the user terminal 80. Thus, the user can be provided with a stereo sound obtained from a plurality of audio signal sources located at different positions 21, 22, 23 within the audio space and may therefore experience a representation of the audio experience at the selected location 70 in the area 10.

As shown in FIG. 2, each mobile terminal 20 comprises: a microphone 30 to convert sound at the microphone location into an electrical audio signal; a loudspeaker 31; an interface 32; an antenna 50, a control unit 33 and a memory 34. Each mobile terminal 20 further comprises a positioning module 40, such as a global positioning system (GPS) receiver configured to receive timing data from a plurality of satellites and to generate location data from the timing data, the location data corresponding to the location of the mobile phone.

Referring to FIG. 2, each mobile terminal 20 is configured to communicate with a remote server 60 via a wireless network 90 such as a 3G network. Each mobile terminal 20 is configured to transmit an audio signal, generated by the mobile terminal 20 to server 60, via the network 90. Each mobile terminal 20 is further configured to transmit location data generated by the corresponding positioning module 40 to server 60, via the network 90, the location data corresponding to the location of the mobile terminal 20.

As shown in FIG. 2, server 60 comprises a communication unit 100, a processor 110, and a memory 120. Referring to FIG. 2, server 60 also comprises further processor 105, although server could alternatively have a single processor. The communication unit 100 is configured to receive audio signals and location data from the mobile terminals 20. The processor 110 is configured to generate a stereo signal in dependence on the received audio signals, location data and on the selected location data corresponding to the location 70 selected by the user. Dual processing using processors 105 and 110 may be used to generate the stereo signal. Server 60 is configured to transmit the stereo signal to user terminal 80 via a network such as wireless network 130.

Although network 90 and network 130 are shown as separate networks in FIG. 2, alternatively, the network through which the audio-signal sources communicate with server 60 could be the same as the network through which server 60 communicates with the terminals. The network 90 and/or the network 130 may, for example be a GSM Network, a GPRS or EDGE Network, a 3G Network, a wireless LAN or a Wi-Max network. However, the invention is not intended to be limited to the use of wireless networks and other networks such as a local area network or the Internet could be used in place of the network 90 and/or the network 130.

Referring to FIG. 2, the mobile user-terminal 80 comprises a control unit 140, a memory 150, a microphone 155, a communication unit 160 and an interface 170 having a keypad 175 and a display 176. Data describing the area 10 may be stored in the memory of the mobile user-terminal 80, and/or may be received from server 60. The mobile user-terminal may be configured to display a representation of the area 10 based on this data on the display 176. A user may view the representation of the area 10 on the display 176 and select a location 70 within the area 10 using the keypad 175.

When the user has selected a location in the audio space, selected location data corresponding to the selected location is sent by the terminal 80 to server 60. Server 60 is configured to generate a stereo signal in dependence on the audio signals, the audio signal source location data and the selected location data and to transmit the generated audio signal to the terminal 80. The user may then listen to the stereo sound corresponding to the stereo signal on the headphones 85.

The user may also select an orientation in the area 10 at the terminal 80. Orientation data, corresponding to the selected orientation, may be sent by the terminal 80 to server 60. Server 60 may be configured to generate the stereo signal in dependence on the audio signals, the audio signal source location data, the selected location data and the orientation data and to transmit the generated stereo audio signal to the terminal 80.

As shown in FIG. 2, the system may comprise a plurality of mobile user-terminals 80, 81, 82. The mobile user-terminals 81, 82 of FIG. 2 are configured in the same manner as the mobile user-terminal 80. Thus, the system may be a multi-user system. Individual users having separate mobile user-terminals 80, 81, 82 may select a location within the area 10 and may receive a stereo sound from server 60 corresponding to the selected location.

Figure 3:
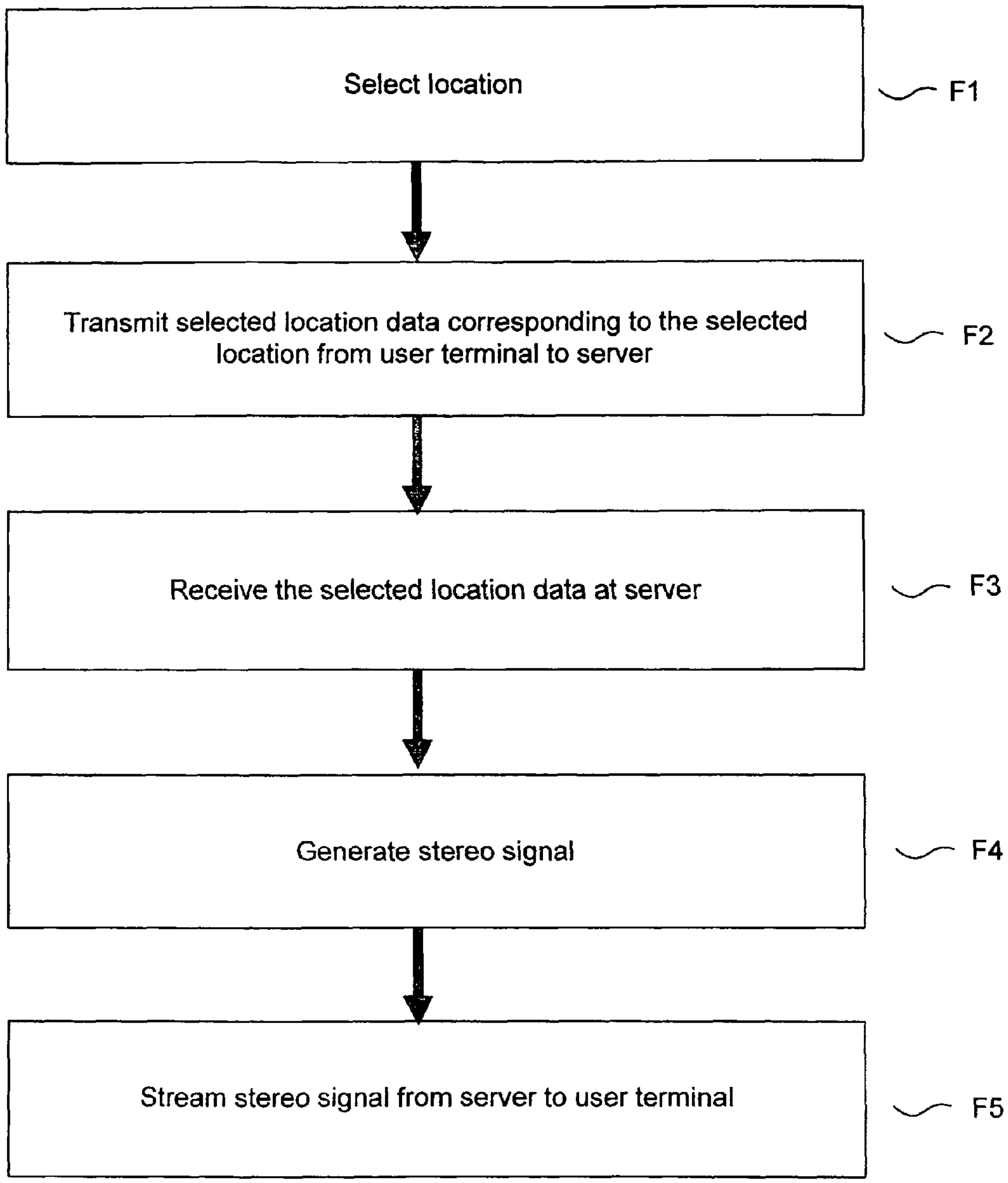
FIG. 3 shows a flow chart depicting a process by which a stereo signal may obtained by a user according to embodiments.

FIG. 3 shows a flow chart depicting a process by which a stereo signal may obtained by a user.

Referring to FIG. 3, in step F1, a user selects a location 70 in the area 10 using the user interface 170 of user terminal 80.

In step F2, terminal 80 transmits selected location data corresponding to the selected location to server 60.

In step F3, server 60 receives the selected location data. Optionally, server 60 may transmit request data to the mobile terminals 20 when the selected location data is received. The request data may comprise a request to transmit audio signals and audio signal source location data from the terminals 20 to server 60. The mobile terminals 20 may be configured to transmit the audio signals and the audio signal source location data to server 60 in response to receiving the request data. Alternatively, server 60 may receive audio signals and audio signal source location data from the user terminals 20 continuously, or periodically throughout a predetermined period. For example, the audio space may comprise a concert venue and a concert may be held in the concert venue during a scheduled period. The user terminals 20 in the concert venue may be configured to transmit audio signals and audio signal source location data to server 60 throughout the scheduled period of the concert.

In step F4, the processor 110 of server 60 generates a stereo signal in dependence on the selected location data, the audio signal source location data and the audio signals received from the mobile terminals 20 by server 60.

In step F5, server 60 streams or otherwise transmits the stereo signal to the user terminal 80.

Figure 4:
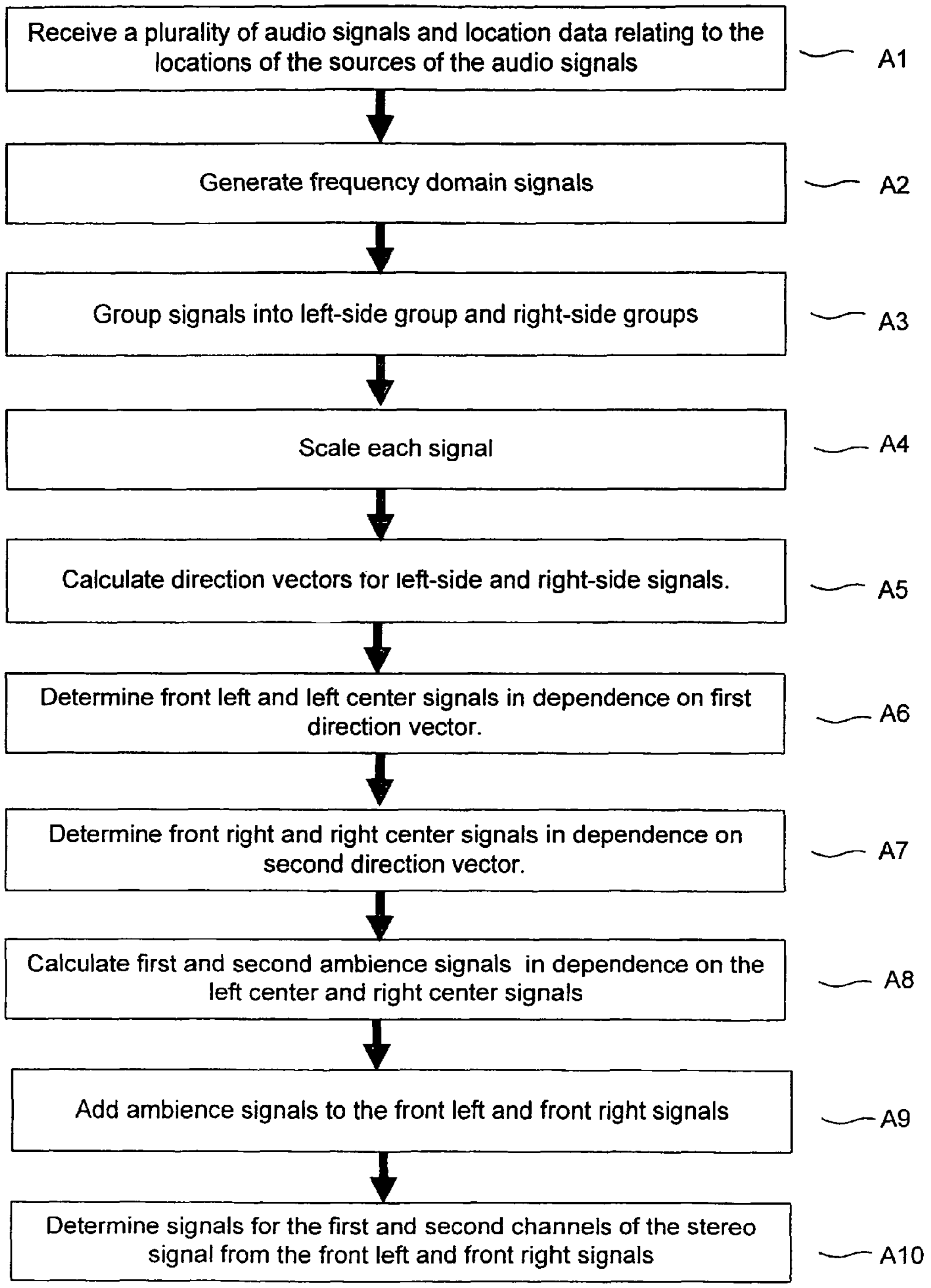
FIG. 4 illustrates a method of generating a stereo signal according to embodiments.

FIG. 4 is a flow chart illustrating a method of generating a stereo signal. Processor 110 may be configured to generate a stereo signal according to the method illustrated in FIG. 4.

In step A1, processor 110 receives a plurality of audio signals. The audio signals are represented by data streams. The data streams may be packetized. Alternatively the data streams may be provided in a circuit-switched manner. The data streams may represent audio signals that have been reconstructed from coded audio signals by a decoder. The source of each audio signal may have a different location within the area 10. As shown in A1, the processor also receives location data relating to the locations of the sources of the audio signals. The audio signals may be received by the processor 110 from the communication unit 100 of server 60. The location data may be generated by the positioning module 40 of the mobile terminals 20, and may be received by the processor 110 from the communication unit 100 of server 60, which may be configured to receive location data from the mobile terminals 20 via the network 90.

In step A2, each audio signal is divided into overlapping frames, windowed and Fourier transformed using a discrete Fourier transform (DFT), thereby generating a plurality of signals in the frequency domain. A 50% overlap may, for example, be used. The window function may be defined as:

$$w(i) = \sin\left((i + 0.5) \cdot \frac{\pi}{K}\right), \ 0 \le i < K$$

Where K is the length of a frame. Thus, the frequency representation of the audio signals may be obtained according to the formula:

$$\bar{f}_{m,t} = DFT(\bar{w}^T \cdot \bar{x}_{m,t})$$

Where m denotes the $m^{th}$ signal, t denotes the frame number, x is the time domain input frame and DFT is the transformation operator. The "bar" notation used in $\bar{f}_{m,t}$ denotes that this quantity is a vector. In this case $\bar{f}_{m,t}$ is a vector comprising a plurality of spectral bins. In addition to the "bar" notation, vectors will also be denoted herein with boldface symbols.

Although each audio signal is described above as being transformed using a Fourier transform such as a discrete Fourier transform, any suitable representation could be used, for example any complex valued representation, or any one of, or any combination of: a discrete cosine transform, a modified sine transform or a complex valued quadrature mirror filterbank.

In step A3, the N audio signals are grouped into left-side and right-side signals. Step A3 comprises determining coordinates for each audio signal source relative to the user-selected location 70. The coordinates of the audio signal sources are determined relative to the axes of a coordinate system, which may be predetermined axes or user-specified axes determined in dependence on orientation information received by server 60.

The coordinate system may be a polar coordinate system having a polar axis along a predetermined direction in the audio space. The memory 120 of server 60 or the memory 34 of the terminal 20 may comprise data relating to the polar axis. Alternatively, if selected orientation data relating to a selected orientation is received from terminal 80, the polar axis may be determined from the selected orientation data.

Next, a radial coordinate and an angular coordinate is determined for each mobile communication terminal 20 in dependence on the selected location data and the audio signal source location data. The radial coordinate describes the distance of a mobile communication terminal 20 from the selected location 70 and the angular coordinate describes the angular direction of the audio signal source with respect to the selected location. The audio signals are then grouped into left-side and right-side signals according to the determined co-ordinates. The left-side signal group is formed by the group of audio signals which have audio signal source angular coordinates for which $90° \leq \theta < 270°$. The right-side signal group is formed by the other signals, i.e, the signals which have audio signal source angular coordinates for which $\theta_m < 90°$ and for which $\theta_m \geq 270°$.

In step A4, each signal is scaled. It has been found that scaling the signals results in an improved stereo experience for the user. In one example, each signal is scaled to equalize the radial position with respect to the selected location. That is, the signals may be scaled so that they appear to be recorded from the same distance. The scaling may, for example, be an attenuating linear scaling. The attenuating linear scaling may take the form:

$$\bar{f}_{m,t} = \frac{d_m}{D} \cdot \bar{f}_{m,t},\ 0 \leq m < N$$

where $d_m$ is the radial position on the $m^{th}$ signal and where D is the maximum distance from the selected location, determined according to D=max (d).

In step A5, direction vectors are calculated for the left-side and right-side groups of signals. That is, a first direction vector is calculated for the left-side group of signals and a second direction vector is calculated for the right-side signals.

Figure 5:
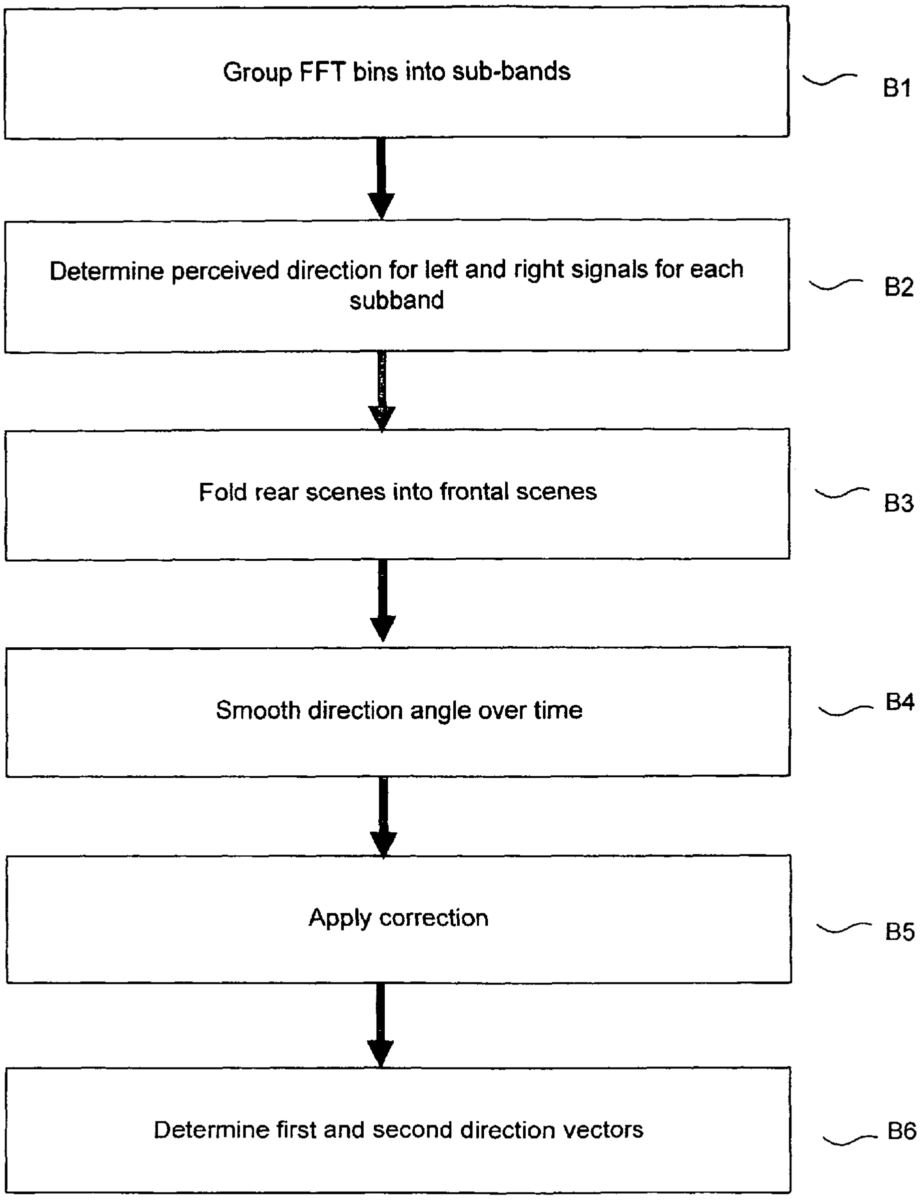
FIG. 5 illustrates a process of determining first and second direction vectors according to embodiments.

FIG. 5 illustrates a process of determining first and second direction vectors.

In step B1, FIG. 5 the FFT bins are grouped into sub-bands, in order to improve computational efficiency. The sub-bands may be non-uniform and may follow the boundaries of the Equivalent Rectangular Bandwidth (ERB) bands, which reflect the auditory sensitivity of the human ear. The grouping may be as follows:

$$e_{L_{m,i}} = \sqrt{\sum_{j=sbOffset[m]}^{sbOffset[m+1]-1} \left( \sum_{n \in T} \left| \bar{f}_{(angle_{L_i}),n}(j) \right|^2 \right)},\ 0 \leq i < N_L$$

$$e_{R_{m,i}} = \sqrt{\sum_{j=sbOffset[m]}^{sbOffset[m+1]-1} \left( \sum_{n \in T} \left| \bar{f}_{(angle_{R_i}),n}(j) \right|^2 \right)},\ 0 \leq i < N_R$$

where $$N_L = \sum_{n \in N} \begin{cases} 1, & S_n == \text{left-side} \\ 0, & \text{otherwise} \end{cases}$$

-continued $$N_R = \sum_{n \in N} \begin{cases} 1, & S_n == \text{right-side} \\ 0, & \text{otherwise} \end{cases}$$

$$angle_L = \begin{cases} i & S_i == \text{left-side} \\ \text{move to next index} & \text{otherwise} \end{cases},\ 0 \leq i < N$$

$$angle_R = \begin{cases} i & S_i == \text{right-side} \\ \text{move to next index} & \text{otherwise} \end{cases},\ 0 \leq i < N$$

Thus, $N_L$ is the number of signals in the left-side group and $N_R$ is the number of signals in the right-side group. $angle_L$ is a vector of indexes for the left-side signals and $angle_R$ is a vector of indexes for the right-side signals. Accordingly, the size of the vector $angle_L$ is equal to the number of signals in the left-side group, and the size of the vector $angle_R$ is equal to the number of signals in the right-side group. SbOffset describes the nonuniform frequency band boundaries. $|T|$ is the size of the time-frequency tile, which is the number of successive frames which are combined in the grouping. T may, for example be $\{t, t+1, t+2, t+3\}$. Successive frames may be grouped to avoid excessive changes, since perceived sound events may change over ~100 ms. The sub-band index m may vary between 0 and M, where M is the number of subbands defined for the frame. The invention is not intended to be limited to the grouping described above any many other kinds of grouping could be used, for example a grouping in which the size of a group is the size of a spectral bin.

In step B2, the perceived direction of each source is determined for each subband. This determination may comprise defining Gerzon vectors according to:

$$g_{L_{re,m}} = \frac{\sum_{i=0}^{N_L - 1} \left( e_{L_{m,i}} \cdot \cos\left(\theta_{angle_{L_i}}\right) \right)}{\sum_{i \in N_L} e_{L_{m,i}}}$$

$$g_{L_{im,m}} = \frac{\sum_{i=0}^{N_L - 1} \left( e_{L_{m,i}} \cdot \sin\left(\theta_{angle_{L_i}}\right) \right)}{\sum_{i \in N_L} e_{L_{m,i}}}$$

$$g_{R_{re,m}} = \frac{\sum_{i=0}^{N_R - 1} \left( e_{R_{m,i}} \cdot \cos\left(\theta_{angle_{R_i}}\right) \right)}{\sum_{i \in N_R} e_{R_{m,i}}}$$

$$g_{R_{im,m}} = \frac{\sum_{i=0}^{N_R - 1} \left( e_{R_{m,i}} \cdot \sin\left(\theta_{angle_{R_i}}\right) \right)}{\sum_{i \in N_R} e_{R_{m,i}}}$$

Theory relating to Gerzon vectors is discussed in Gerzon, Michael A, "General theory of Auditory Localisation", AES $92^{nd}$ Convention, March 1992, Preprint 3306.

The radial position and direction angle of the sound events for the left-side and right-side signals may then be determined from the Gerzon vectors as follows:

$$r_{L_m} = \sqrt{g_{L_{re,m}}^2 + g_{L_{im,m}}^2}\ \theta_{L_m} = \angle(g_{L_{re,m}}, g_{L_{im,m}})$$

$$r_{R_m} = \sqrt{g_{R_{re,m}}^2 + g_{R_{im,m}}^2}\ \theta_{R_m} = \angle(g_{R_{re,m}}, g_{R_{im,m}})$$

In this example, the eventual stereo signal generated by the processor has only has two channels, and therefore cannot produce front, left, right and rear signals simultaneously. In step B3, rear scenes are folded into frontal scenes by, for example modifying the direction angles as follows:

$$\theta_{L_m} = \begin{cases} \theta_{L_m} - 90°, & \theta_{L_m} \geq 180° \text{ and } \theta_{L_m} < 270° \\ \theta_{L_m} - 270°, & \theta_{L_m} \geq 270° \\ \theta_{L_m}, & \text{otherwise} \end{cases}$$

$$\theta_{R_m} = \begin{cases} \theta_{R_m} - 90°, & \theta_{R_m} \geq 180° \text{ and } \theta_{R_m} < 270° \\ \theta_{R_m} - 270°, & \theta_{R_m} \geq 270° \\ \theta_{R_m}, & \text{otherwise} \end{cases}$$

In step B4, the direction angle are smoothed over time to filter out any sudden changes, for example by modifying the direction angles as follows:

$$\theta_{L_m}=0.7\cdot\theta_{L_{m,j-1}}+0.3\cdot\theta_{L_m},\ \theta_{R_m}=0.7\cdot\theta_{R_{mj-1}}+0.3\cdot\theta_{R_m}$$

where $\theta_{L_{mj-1}}$ and $\theta_{R_{mj-1}}$ are the values of the direction angle from the previous processing iteration for left-side and right-side signals respectively. These values are initialised to 0 at start-up.

In step B5, a correction is applied. The correction will only be described in relation to the left-side signals. A corresponding correction may be applied to the right-side signals.

Figure 6:
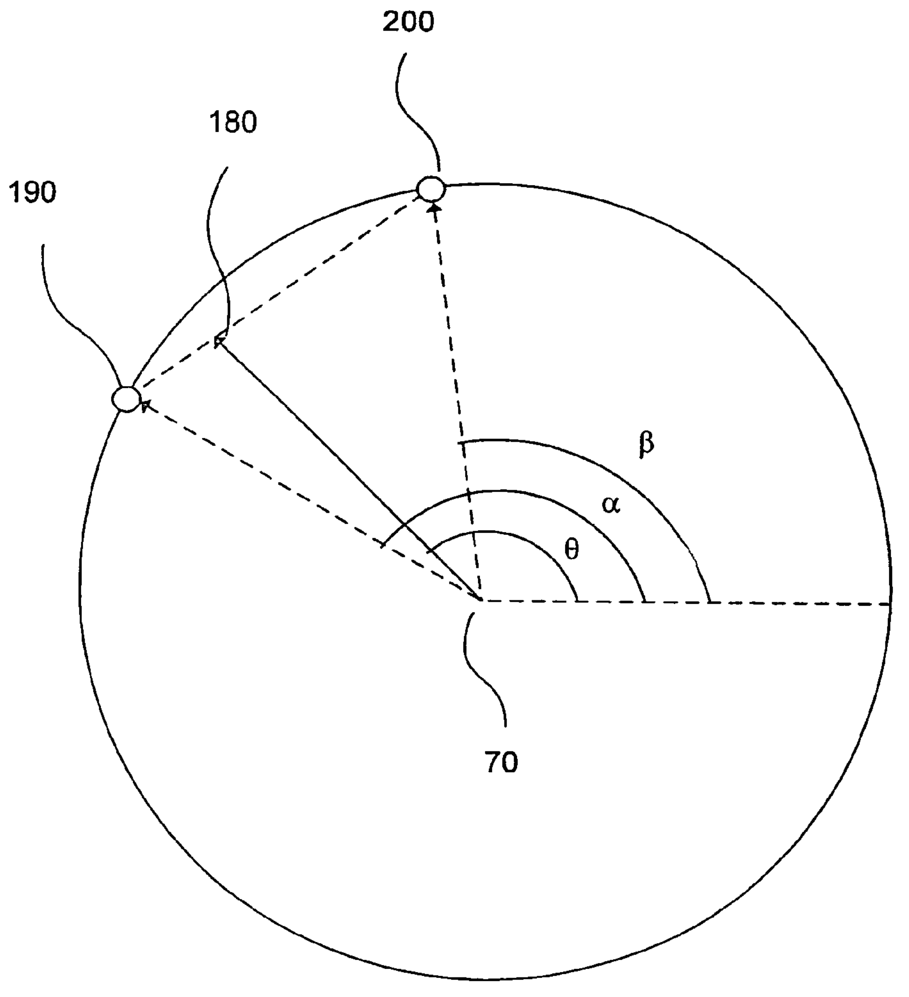
FIG. 6 illustrates the encoding locus of a Gerzon vector according to embodiments.

As shown in FIG. 6, the radial position for the left-side signals, $r_L$, is bounded by the encoding locus 180. Accordingly, the radial position $r_L$, may be corrected so as to extend the radial position to the unit circle. For example, gain values for the correction may be determined according to:

$$g_1 \cdot \begin{bmatrix} \cos(\alpha) \\ \sin(\alpha) \end{bmatrix} + g_2 \cdot \begin{bmatrix} \cos(\beta) \\ \sin(\beta) \end{bmatrix} = \begin{bmatrix} dVec_{re} \\ dVec_{im} \end{bmatrix}$$

$$\overline{g} = \begin{bmatrix} \cos(\alpha) & \cos(\beta) \\ \sin(\alpha) & \sin(\beta) \end{bmatrix}^{-1} \cdot d\overline{Vec}$$

where $dVec_{re}=r\cdot\cos(\theta)$, $dVec_{im}=r\cdot\sin(\theta)$ and $\alpha$ and $\beta$ are microphone signal angles adjacent to $\theta$, as shown in FIG. 6.

Gains may also be scaled to unit-length vectors. For example, gain values may be modified according to:

$$g_1 = \frac{g_1}{\sqrt{g_1^2 + g_2^2}},\ g_2 = \frac{g_2}{\sqrt{g_1^2 + g_2^2}}$$

In step B6, a first direction vector is calculated for the left side signals in dependence on the gain values. The direction vector for the left side signal may, for example, be calculated according to the formula:

$$dVec_{out_{re}}=dVec_{re}\cdot g_1,\ dVec_{out_{im}}=dVec_{im}\cdot g_2$$

A second direction vector may be calculated in a corresponding manner for the right side signals.

Referring to FIG. 4, step A6, once the first and second direction vectors have been determined, front left and left center signals for front left and left center channels, respectively, are determined in dependence on the first direction vector.

Amplitude panning gains may first be calculated using the VBAP technique. The VBAP technique is known per se and is described in Ville Pulkki, "Virtual Sound Source Positioning using Vector Base Amplitude Panning" JAES Volume 45, issue 6, pp 456-466, June 1997. The gains for the front left and front center channels may be determined according to:

$$g_{front_{L,m}} \cdot \begin{bmatrix} \cos(\chi) \\ \sin(\chi) \end{bmatrix} + g_{center_{L,m}} \cdot \begin{bmatrix} \cos(\delta) \\ \sin(\delta) \end{bmatrix} = d\overline{Vec}_{L_{out,m}}$$

$$\begin{bmatrix} g_{front_{L,m}} \\ g_{center_{L,m}} \end{bmatrix} = \left| \begin{bmatrix} \cos(\chi) & \cos(\delta) \\ \sin(\chi) & \sin(\delta) \end{bmatrix}^{-1} \cdot d\overline{Vec}_{L_{out,m}} \right|$$

where $\chi$ and $\sigma$ are channel angles for the front left and center channels. These may, for example be set to 120° and 90° respectively. The gains may also be scaled depending on the frequency range.

Frequencies below 1000 Hz:

$$g_{front_{L,m}} = \frac{g_{front_{L,m}}}{\sqrt{g_{front_{L,m}}^2 + g_{center_{L,m}}^2}},$$

$$g_{center_{L,m}} = \frac{g_{center_{L,m}}}{\sqrt{g_{front_{L,m}}^2 + g_{center_{L,m}}^2}}$$

Frequencies above 1000 Hz:

$$g_{front_{L,m}} = \frac{g_{front_{L,m}}}{g_{front_{L,m}}^2 + g_{center_{L,m}}^2},$$

$$g_{center_{L,m}} = \frac{g_{center_{L,m}}}{g_{front_{L,m}}^2 + g_{center_{L,m}}^2}$$

The front left and left center signals may now be determined as:

$$\overline{f}_{L_{out,n}}(j) = g_{front_{L,m}} \cdot \overline{f}_{L,n}(j),$$

$$\overline{f}_{L_{center,n}}(j) = g_{center_{L,m}} \cdot \overline{f}_{L,n}(j),$$

$$sbOffset[m] \leq j < sbOffset[m+1]$$

where $$\overline{f}_{L,n}(j) = amp_{L,n,j} \cdot e^{j\psi_{n,j}}$$

$$amp_{L,n,j} = \left( \sum_{k=0}^{N_L-1} \left| \overline{f}_{(angle_{L_k}),n}(j) \right|^2 \right)^{0.47}$$

$$\psi_{n,j} = \angle\left( \sum_{k=0}^{N_L-1} \mathrm{Re}\left(\overline{f}_{(angle_{L_k}),n}(j)\right), \sum_{k=0}^{N_L-1} \mathrm{Im}\left(\overline{f}_{(angle_{L_k}),n}(j)\right) \right)$$

Front left and left center signals may thus be determined for each m between 0 and M and for each $n \in T$.

In step A7, FIG. 4, front right and right center signals for front left and left center channels, respectively, are determined in dependence on the second direction vector. The gains for the front right and right center channels may be determined according to:

$$\begin{bmatrix} g_{front_{R,m}} \\ g_{center_{R,m}} \end{bmatrix} = \begin{bmatrix} \cos(\delta) & \cos(\varphi) \\ \sin(\delta) & \sin(\varphi) \end{bmatrix}^{-1} \cdot dV\vec{ec}_{R_{out,m}}$$

where ϕ is the channel angle for the front right channel. For example, this may be set to 60°. The gains may also be scaled depending on the frequency range, as described above in relation to the front left and left center channels. The front right and right center signals may then be determined as:

$$\bar{f}_{R_{out,n}}(j) = g_{front_{R,m}} \cdot \bar{f}_{R,n}(j),$$

$$\bar{f}_{R_{center,n}}(j) = g_{center_{R,m}} \cdot \bar{f}_{R,n}(j),$$

$$sbOffset[m] \le j < sbOffset[m+1]$$

where $$\bar{f}_{R,n}(j) = amp_{L,n,j} \cdot e^{j\psi_{n,j}}$$

$$amp_{R,n,j} = \left( \sum_{k=0}^{N_R-1} \left| \bar{f}_{(angle_{R_k}),n}(j) \right|^2 \right)^{0.47}$$

$$\psi_{n,j} = \angle \left( \sum_{k=0}^{N_R-1} \mathrm{Re}\left(\bar{f}_{(angle_{R_k}),n}(j)\right), \sum_{k=0}^{N_L-1} \mathrm{Im}\left(\bar{f}_{(angle_{R_k}),n}(j)\right), \right)$$

Front right and right center signals may thus be determined for each m between 0 and M and for each $n \in T$.

In step A8, first and second ambience signals are calculated in dependence on the left center and right center signals. Preferably, the first and second ambience signals are calculated in dependence on the difference between the left center and the right center signals. The first ambient signal, denoted below by $am\bar{b}_{L,n}$, may be calculated according to the formula:

$$am\bar{b}_{L,n} = \frac{1}{\sqrt{2}} \cdot \left(\bar{f}_{L_{center,n}} - \bar{f}_{R_{center,n}}\right),\ n \in \bar{T}$$

The second ambient signal, denoted below by $am\bar{b}_{L,n}$, may be calculated according to the formula:

$$am\bar{b}_{R,n} = \frac{1}{\sqrt{2}} \cdot \left(\bar{f}_{R_{center,n}} - \bar{f}_{L_{center,n}}\right),\ n \in \bar{T}$$

In step A9, the ambience signals are added to the front left and front right signals. The addition of ambience signals improves the feeling of spaciousness for the user.

The ambience signals may, for example, be added to the front left and front right signals according to the formulas:

$$\bar{f}_{L_{out,n}} = \bar{f}_{L_{out,n}} + am\bar{b}_{L,n},\ \bar{f}_{R_{out,n}} = \bar{f}_{R_{out,n}} + am\bar{b}_{R,n},\ n \in \bar{T}$$

In step A10, once the ambience signals have been added to the front left and front right signals, signals for the first and second channels of the stereo signal are determined from the front left and front right signals. The signal for the first channel of the stereo signal may be obtained from $\bar{f}_{L_{out,n}}$ by converting $\bar{f}_{L_{out,n}}$ to the time domain by applying, for example, an inverse DFT and then windowing the inverse transformed samples and overlap adding the samples. Overlapping adding the samples may comprise adding the latter half of the previous frame to the first half of each frame.

The signal for the second channel of the stereo signal is determined from $\bar{f}_{R_{out,n}}$ in a corresponding manner to the manner in which the signal for the first channel is determined.

The procedure illustrated in FIG. 4 generates a stereo signal which can be used to produce a high quality stereo sound for a user. Furthermore, the procedure is resilient to changing characteristics of the audio signal source. Variations in, for example, dynamic range may not have a significant effect on the generated stereo signal. This is because when the signals are first combined, it is possible that some signals may contribute more heavily to the actual sound source, while other signals might contribute more heavily to the ambience of the sound source.

Figure 7:
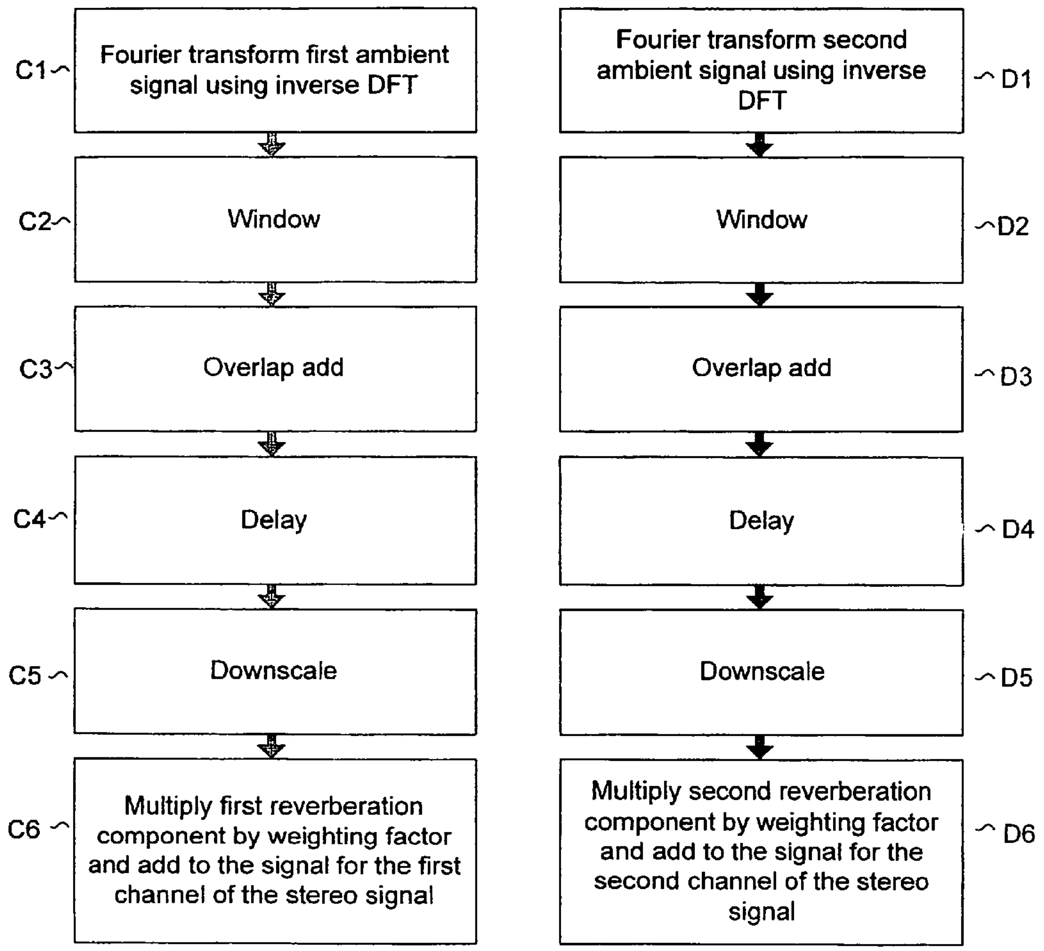
FIG. 7 illustrates a process for adding reverberation to a stereo signal according to embodiments.

FIG. 7 illustrates a process for adding reverberation to the stereo signal. Adding reverberation components to the stereo signal has the advantage of increasing the impression of spaciousness experienced by the user. The process shown in FIG. 7 may be implemented once the process shown in FIG. 4 is completed.

In step C1, FIG. 7, an inverse transform such as an inverse DFT is applied to the first ambient signal. In step C2, the inverse transformed time domain samples are windowed. In step C3, the signals are overlap added. In step C4 the resulting time domain signal are delayed. Then, in step C5, the result is downscaled. This forms the first reverberation component. The delay may, for example, be in the range 20-40 ms, for example 31.25 ms. The second reverberation component is determined from the second ambient component in a corresponding manners in steps D1-D5.

In step C6, the first reverberation component is multiplied by a weighting factor and added to the signal for the first output channel. Similarly, in step D6 the second reverberation component is multiplied by a weighting factor and added to the signal for the second output channel. That is, the signals for the first and second output channels may be modified according to the equations:

$$L_{t,n} = L_{out,t} + c \cdot L_{amb_{t,n}},\ R_{t,n} = R_{out,t} = c \cdot R_{amb_{t,n}},\ n \in \bar{T}$$

The weighting factor c, may be a value in the range 0.5-1.5, for example 0.75.

Although the processor has been described above as generating a stereo (2-channel) signal in dependence on the audio signals, the audio signal source location data and the selected location data, in other embodiments the processor is configured to generate a different multichannel signal, for example a signal having any number of channels in the range 3-12. The generated multichannel signal may be encoded and transmitted from the server to a terminal, where it may be decoded and used to generate a surround sound experience for a user. For example, each channel of the multichannel signal may be used to generate sound on a separate loudspeaker. The loudspeakers may be arranged in a symmetric configuration. In this way, a high quality, immersive sound experience may be provided to the user, which the user may vary by selecting different locations in the area 10.

An embodiment incorporating a modification of the method of operation of the processor shown in FIG. 4 will now be described in which a 5-channel signal having front left, front right, center, rear left and rear right channels is generated.

In this embodiment, signals for the front left and front right channels of the 5-channel signal may be generated in a similar manner to the manner in which the signals for the left and right channels are generated in the case of a stereo signal (as is described above in relation to FIGS. 4 to 6). However, in generating signals for the front left and rear right channels, the left side signal group may be formed by the group of audio signals which have audio signal source angular coordinates for which 90°≤θ<180° (i.e.: signals in a top left quadrant) and the right-side signal group may be formed by the signals which have audio signal source angular coordinates for which 0°≤θ<90° (i.e. signals in a top right quadrant).

A signal for the center channel of the 5-channel signal may be generated by a process comprising taking the average of $\tilde{f}_{L_{center,n}}$ and $\tilde{f}_{R_{center,n}}$.

Signals for the rear left and rear right channels of the 5-channel signal may also be generated in generated in a similar manner to the manner in which the signals for the left and right channels are generated in the case of a stereo signal (as is described above in relation to FIGS. 4 to 6). In generating the rear left and rear right channels, the left side signal group may be formed by the group of audio signals which have audio signal source angular coordinates for which 180°≤θ<270° (i.e.: signals in a bottom left quadrant) and the right-side signal group may formed by the signals which have audio signal source angular coordinates for which 270°≤θ<360° (i.e.: signals in a bottom right quadrant). In addition, the channel angles during the calculation may be changed according to $\chi$=240°, $\sigma$=270° and $\phi$=300°.

Although the mobile terminals are described to transmit their location, as determined by their positioning module, the locations of the mobile terminals may instead be determined in some other way. For instance, a network, such as the network 90, may determine the locations of the mobile terminals. This may occur utilising triangulation based on signals received at a number of receiver or transceiver stations located within range of the mobile terminals. In embodiments in which the mobile terminals do not calculate their locations, the location information may pass directly from the network, or other location determining entity, to server 60 without first being provided to the mobile terminals.

Although the audio signal sources have been described above as forming part of mobile terminals, the audio signal sources could alternatively be fixed in position within the area 10. The area 10 may have a plurality of plural sources 15, 16 of audio energy, and also plural audio signal sources in the form of microphones positioned in different locations in the audio space. This may be of particular interest in a conference environment in which a number of potential sources of audio energy (i.e. people) are co-located with microphones distributed in fixed locations around an area. This may be of particular interest because the stereo signals experienced at different locations within such an environment necessarily will vary more than would be the case in a corresponding environment including only one source 15 of audio energy.

Furthermore, any type of microphone could be used, for example an omnidirectional, unidirectional or bidirectional microphones.

Moreover, the area 10 may be of any size, and may for example span meters or tens of meters. In the case of large areas or audio scenes, signals from microphones further than a predetermined distance from the selected location may be disregarded when generating the stereo signal. For example, signals from microphones further than 4 meters, or another number in the range 3-5 meters, from the selected location may be disregarded when generating the stereo signal.

Moreover, although FIGS. 1 and 2 show three audio signal sources, this is not intended to be limiting and any number of audio signal sources could be used. Indeed, the embodied system is of particular utility when four or more audio signal sources are used.

Furthermore, although the user terminal may be a mobile user terminal, as described above, the user terminal could alternatively be a desktop or laptop computer, for example. The user may interact with a commercially available operating system or with a web service running on the user terminal in order to specify the selected location and download the stereo signal.

It should be realized that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

What is claimed is:

1. An apparatus, comprising:

at least one processor;

and at least one non-transitory memory including computer program code, the at least one memory and the computer program code configured to, with the at least one processor, cause the apparatus at least to receive a first signal provided by a first mobile user terminal, wherein the first signal comprises first audio data and first location data, wherein the first audio data is based on sound detected at the location of the first mobile user terminal and the first location data is determined at the location of the first mobile user terminal;

receive a second signal provided by a second mobile user terminal, wherein the second signal comprises second audio data and second location data, wherein the second audio data is based on sound detected at the location of the second mobile user terminal and the second location data is determined at the location of the second mobile user terminal;

receive from a user terminal user selected location data relating to a selected location at which a representation of an audio experience is to be created based on the first audio data and the second audio data, wherein said first and second locations are within an area comprising an event location, and said user selected location is also within said area;

generate a multichannel signal in dependence on the first and second audio data, the first and second location data and the user selected location data; and provide the generated multichannel signal to the user terminal, the multichannel signal being configured to create the representation of the audio experience as if from the selected location within the area comprising the event location.

2. An apparatus according to claim 1, wherein the processor is further configured to receive user selected orientation data relating to a selected orientation; and wherein the multichannel signal is generated in dependence on the first and second audio data, the first and second location data, the user selected location data and the user selected orientation data.

3. An apparatus according to claim 1, wherein the processor is configured to generate the multichannel signal by being configured to:

determine first and second direction vectors in dependence on the first and second audio data, the first and second location data and the user selected location data;

generate front left and left center signals in dependence on the first direction vector;

generate front right and right center signals in dependence on the second direction vector;

generate first and second ambience signals in dependence on the left and right center signals;

combine the first ambience signal with the front left signal to provide a first combined signal;

combine the second ambience signal with the front right signal to provide a second combined signal;

generate a signal for a first channel of the multichannel signal in dependence on the first combined signal;

generate a signal for a second channel of the multichannel signal in dependence on the second combined signal.

4. An apparatus according to claim 3, wherein the processor is further configured to add first and second reverberation components to the signals for the first and second channels of the multichannel signal respectively, wherein:

the first reverberation component comprises a delayed signal determined in dependence on the first ambience signal; and the second reverberation component comprises a delayed signal determined in dependence on the second ambience signal.

5. An apparatus according to claim 1, wherein the processor is further configured to:

provide a first scaled audio signal by scaling the first signal in dependence on a distance between the location of the first mobile user terminal and the user selected location;

provide a second scaled audio signal by scaling the second signal in dependence on a distance between the location of the second mobile user terminal and the user selected location;

generate the multichannel signal in dependence on the first and second scaled audio signals, the first and second location data and the user selected location data.

6. An apparatus according to claim 5, wherein the processor is configured to:

scale the first audio signal in generally linear dependence on said distance between the location of the first mobile user terminal and the user selected location; and scale the second audio signal in generally linear dependence on said distance between the location of the second mobile user terminal and the user selected location.

7. An apparatus according to claim 5, wherein the processor is configured to:

scale the first audio signal by attenuating the first signal;

scale the second audio signal by attenuating the second signal.

8. An apparatus according to claim 1, wherein the apparatus is a server or cooperating servers.

9. An apparatus according to claim 1, wherein the multichannel signal is a stereo signal.

10. An apparatus according to claim 1, wherein the multichannel signal has five channels.

11. A method comprising:

receiving a first signal provided by a first user mobile terminal, wherein the first signal comprises first audio data and first location data, wherein the first audio data is representative of sound detected at the location of the first mobile user terminal and the first location data is determined at the location of the first mobile user terminal;

receiving a second signal provided by a second mobile user terminal, wherein the second signal comprises second audio data and second location data, wherein the second location data relates to a location of the second mobile terminal audio data is representative of sound detected at the location of the second mobile user terminal and the second location data is determined at the location of the second mobile user terminal;

receiving from a user terminal user selected location data relating to a selected location at which a representation of an audio experience is to be created based on the first audio data and the second audio data, wherein said first and second locations are within an area comprising an event location, and said user selected location is also within said area;

generating a multichannel signal in dependence on the first and second audio data, the first and second location data and the user selected location data; and providing the generated multichannel signal to the user terminal, the multichannel signal being configured to create the representation of the audio experience as if from the selected location within the area comprising the event location.

12. A method according to claim 11, further comprising receiving orientation data relating to a user selected orientation; wherein the multichannel signal is generated in dependence on the first and second audio data, the first and second location data, the user selected location data and the orientation data.

13. A method according to claim 11, further comprising:

determining first and second direction vectors in dependence on the first and second audio data, the first and second location data and the user selected location data;

determining front left and left center signals in dependence on the first direction vector;

determining front right and right center signals in dependence on the second direction vector;

determining first and second ambience signals in dependence on the left and right center signals;

combining the first ambience signal with the front left signal to provide a first combined signal;

combining the second ambience signal with front right signal to provide a second combined signal;

generating a signal for a first channel of the multichannel signal in dependence on the first combined signal; and generating a signal for a second channel of the multichannel signal in dependence on the second combined signal.

14. A method according to claim 13, further comprising adding first and second reverberation components to the signals for the first and second channels of the multichannel signal respectively, wherein:

the first reverberation component comprises a delayed signal determined in dependence on the first ambience signal; and the second reverberation component comprises a delayed signal determined in dependence on the second ambience signal.

15. A method according to claim 11, further comprising:

providing a first scaled audio signal by scaling the first signal in dependence on a distance between the location of the first mobile user terminal and the user selected location;

providing a second scaled audio signal by scaling the second signal in dependence on the distance between the location of the second mobile user terminal and the user selected location; and generating the multichannel signal in dependence on the first and second scaled audio signals, the first and second location data and the user selected location data.

16. A method according to claim 15, wherein:

the first audio signal is scaled in generally linear dependence on said distance between the location of the first mobile user terminal and the user selected location;

the second audio signal is scaled in generally linear dependence on said distance between the location of the second mobile user terminal and the user selected location.

17. A method according to claim 15, further comprising:

scaling the first audio signal by attenuating the first signal;

scaling the second audio signal by attenuating the second signal.

18. A method according to claim 11, wherein the multichannel signal is a stereo signal.

19. A method according to claim 11, wherein the multichannel signal has five channels.

20. A system comprising:

a server; and a terminal;

wherein the terminal is configured to transmit user selected location data to said server; and wherein the server comprises a processor configured to:

receive a first signal provided by a first mobile user terminal, wherein the first signal comprises first audio data and first location data, wherein the first audio data is representative of sound detected at the location of the first mobile user terminal and the first location data is determined at the location of the first mobile user terminal;

receive a second signal provided by a second mobile user terminal, wherein the second signal comprises second audio data and second location data, wherein the second audio data is representative of sound detected at the location of the second mobile user terminal and the second location data is determined at the location of the second mobile user terminal;

receive the user selected location data from the terminal, the user selected location data relating to a selected location at which a representation of an audio experience is to be created based on the first audio data and the second audio data, wherein the location of the first mobile user terminal and the location of the second mobile user terminal are within an area comprising an event location, and the user selected location is also within said area;

generate a multichannel signal in dependence on the first and second audio data, the first and second location data and the user selected location data; and transmit the generated multichannel signal to the terminal, the multichannel signal being configured to create the representation of the audio experience as if from the selected location within the area comprising the event location.

21. A method comprising:

transmitting from a terminal to a server user selected location data; and at the server, receiving a first signal provided by a first mobile user terminal, wherein the first signal comprises first audio data and first location data, wherein the first audio data is representative of sound detected at the location of the first mobile user terminal and the first location data is determined at the location of the first mobile user terminal;

at the server, receiving a second signal provided by a second mobile user terminal, wherein the second signal comprises second audio data and second location data, wherein the second audio data is based on sound detected at the location of the second mobile user terminal and the second location data is determined at the location of the second mobile user terminal;

at the server, receiving the user selected location data from the terminal, the user selected location data relating to a selected location at which a representation of an audio experience is to be created based on the first audio data and the second audio data, wherein the location of the first mobile user terminal and the location of the second mobile user terminal are within an area comprising an event location, and the user selected location is also within said area;

at the server, generating a multichannel signal in dependence on the first and second signals, the first and second location data and the user selected location data; and transmitting the generated multichannel signal from the server to the terminal, the multichannel signal being configured to create the representation of the audio experience as if from the selected location within the area comprising the event location.

22. An apparatus according to claim 1, wherein said user selected location differs from the first and second locations.

23. An apparatus according to claim 1, wherein the user selected location differs from the location of the user.

24. An apparatus according to claim 1, wherein the user terminal is comprised of one of the first user terminal, the second user terminal and a third user terminal.

* * * * *